May 3, 1966 H. R. SHILLINGTON 3,249,821
AN ON-OFF TIME CONTROL CIRCUIT
Filed Feb. 6, 1963
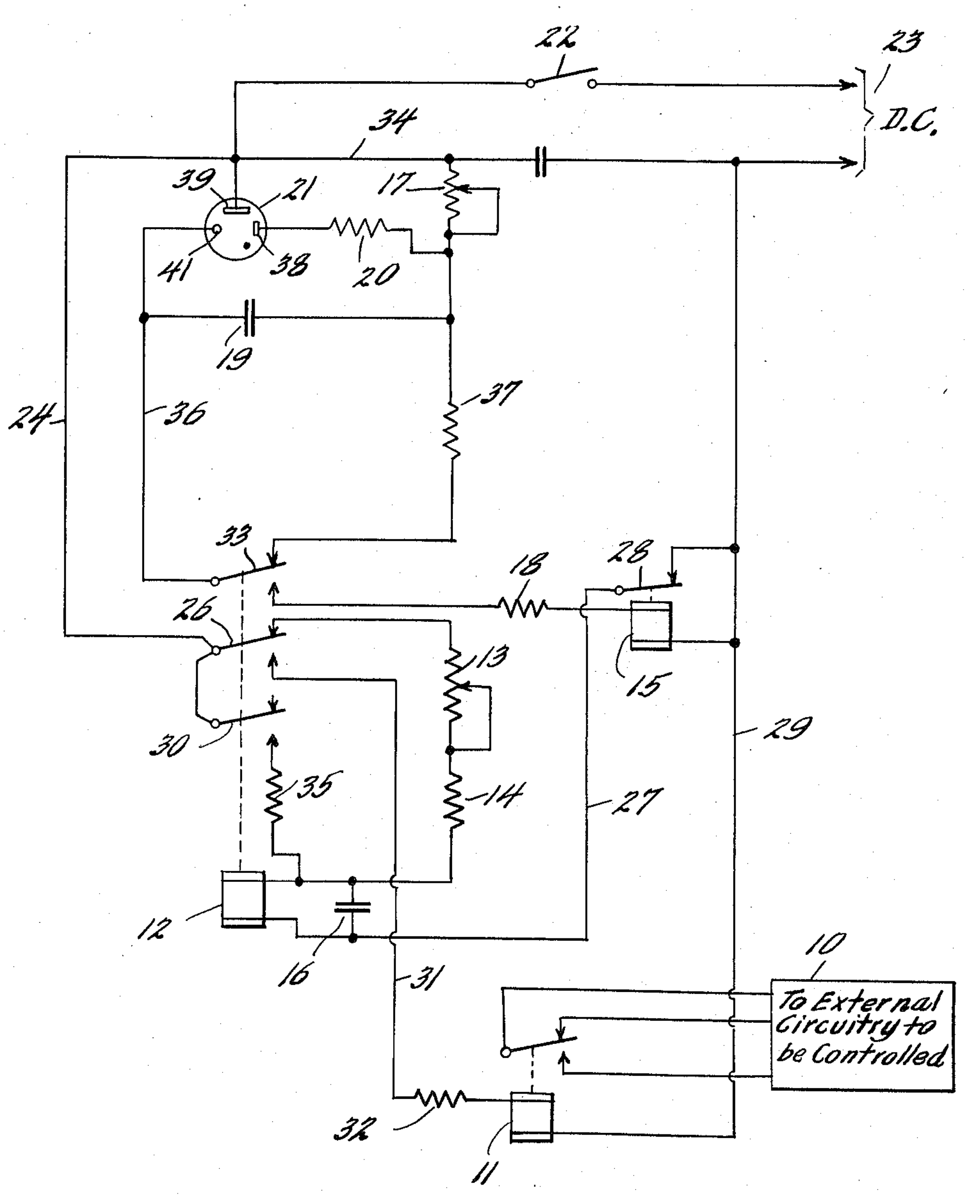
INVENTOR
Harry R. Shillington,
BY R. P. Miller
ATTORNEY United States Patent Office 3,249,821

Patented May 3, 1966

3,249,821

AN ON-OFF TIME CONTROL CIRCUIT

Harry R. Shillington, Glen Ellyn, Ill., assignor to Western Electric Company, Incorporated, New York, N.Y., a corporation of New York Filed Feb. 6, 1963, Ser. No. 256,646
2 Claims. (Cl. 317—142)

This invention relates to an on-off time control circuit and more particularly to a pulse producing circuit wherein the duration of and interval between pulses can be precisely regulated over wide ranges.

It is necessary in many instances to precisely and independently control the operated and unoperated periods of a circuit over variable ranges For example, in an automatic capacitor testing apparatus, capacitors are automatically delivered to a test station wherein a precharged capacitor bank is discharged through the capacitor to be tested. In such a situation it has been found desirable to precisely control the time that the tested capacitor is subjected to the discharging circuit. It is also desirable to control the time interval between operations of the test circuit depending upon the rate of operation of the automatic apparatus. Since these two elements of operation are independent of one another, it is desirable to be able to control the duration of test independent of the duration between tests and yet have both operations regulated by a single circuit. Further, in testing various rated capacitors, it is necessary to vary, over wide ranges, the duration of and interval between pulses.

In conventional delay circuits utilizing thermal delay relays, pneumatic delay relays or copper slug relays, the delay periods cannot be precisely controlled over wide ranges. Further difficulty is encountered when resistors are utilized to control delay periods because the introduction of resistance in series with operating relays results in a reduction in the current available to operate the relays. It is thus apparent that where large delays are required in relay circuits, large resistors cannot be used because of the accompanying drop in current which is insufficient to operate the relays.

It is accordingly an object of the present invention to provide a new and improved on-off time control circuit.

A second object of the invention is to provide an on-off timing circuit having two operating stages wherein adjustment of independent circuit parameters permits control over wide ranges.

Another object of the invention resides in a pulse generating circuit having a pair of relays that are alternately operated under the control of a pair of timing circuits, of which at least one includes electronic facilities that avoid the introduction of high resistance in series with the associated relay.

With these and other objects in view, the present invention contemplates a circuit having a pair of relays that are alternately operated by a pair of independently controllable time delay circuits. In operation of the circuit, a first capacitor is charged to a predetermined potential in a period of time determined by the setting of a first variable resistor to energize the first relay. Upon energization of the first relay, a third or output relay is operated and a second capacitor is charged to a predetermined potential in a period of time determined by the setting of a second variable resistor whereupon a control tube is triggered. Operation of the control tube energizes the second relay, which functions to deenergize the first relay and the output relay. The circuit is now in condition to automatically initiate another cycle of operation. It may be appreciated that the output relay is maintained operated for a period of time as determined by the time required to build up a sufficient charge through the second variable resistor to operate the control tube.

A complete understanding of this invention may be had by reference to the following detailed description when read in conjunction with the accompanying drawing, wherein a circuit is shown having a pair of alternately operated relays that are controlled by delay circuits in accordance with the principles of the invention.

Referring to the drawing, there is shown an external circuit 10 that is to be cyclically operated to effectuate testing of capacitors. The external circuit 10 may be any device that is to be cyclically controlled. The cyclic control of the circuit 10 is attained by the periodic energization of a relay 11, which in turn is controlled by the alternate operation of a pair of relays 12 and 15. A first timing circuit including an adjustable resistor 13, a fixed resistor 14, and a capacitor 16 controls the initial time of operation of the relay 12. A second timing circuit including adjustable resistor 17, a fixed resistor 18, and a capacitor 19 in conjunction with a tube 21, controls the time of operation of the second relay 15.

More particularly, considering the operation of the circuit, the closure of a switch 22 applies charging potential from a source 23, over lead 24, through a contact 26 of the deenergized relay 12, through the resistors 13 and 14 to the capacitor 16. The charging of the capacitor 16 takes a predetermined time as determined by the values of the resistor 14 and capacitor 16 and the setting of the adjustable resistor 13. Upon charging of the capacitor 16 to a predetermined value, current from the source 23 passes through the relay 12, over a lead 27, through a contact 28 of the deenergized relay 15 to a grounded lead 29. Energization of the relay 12 draws up contact 26 to complete a circuit for operating the relay 11 which may be traced from the source 23, through the switch 22, over the lead 24, through the now drawn up contact 26, over a lead 31, through a resistor 32, through the relay 11 to the grounded lead 29.

Energization of relay 12 also draws up a contact 30 to establish a locking circuit for the relay through the drawn up contact 30 and a resistor 35.

Energization of the relay 12 also draws up a contact 33 to complete the charging circuit for the capacitor 19 which may be traced from the source 23, through the switch 22, over a lead 34, through the resistor 17 to the capacitor 19, over a lead 36, through the now drawn up contact 33, through the resistor 18, through the relay 15 to the grounded lead 29. The resistance 17 is selected to be of a sufficiently large value to limit current flow during the charging of the capacitor so that operator of the relay 15 is precluded.

Upon accumulation of a predetermined charge on the capacitor 19, the potential of a control electrode 38 of the tube 21 is raised to such an extent as to fire the tube and establish a current path between the anode 39 and cathode 41. This tube may be a double-gap cold cathode gas-filled type. When the tube 21 is rendered conductive, a circuit is completed from the source 23, through the switch 22, through the tube 21, over a lead 36, through the now drawn up contact 33, through the resistor 18, through the relay 15, and to the grounded lead 29. The time delay for operating the tube 21 is determined by the values of resistors 17 and 18 and the capacitor 19. The resistance 17 may be very large in order to obtain a very long time delay. When the tube 21 conducts, the resistor 17 is shunted out of the energizing circuit for the relay 15, thus sufficient current is permitted to flow to operate this relay. A current limiting resistor 20 is placed in the circuit with the control electrode 38 to protect the tube when it is triggered.

Upon operation of relay 15, contact 28 is opened to thereby open the previously established locking circuit for the relay 12, thus deenergizing the relay 12. This in turn causes the closing of back contacts 26, 30, and 33 of relay 12. The closing of contact 33 opens the timing circuit to the relay 15 and discharges the capacitor 19 through a resistor 37 while the closing of contact 26 opens the circuit to the external circuit relay 11 and also closes the timing circuit to the relay 12 to condition the circuit for the subsequent cycle of operation. The circuit will repeat the above-described cycle of operation as long as switch 22 is closed.

It may be seen from the description of the operation of the above-described circuit that the time interval that the external circuit relay 11 is unoperated is variable between predetermined limits by varying the setting of the variable resistor 13, and the interval that the relay 11 is operated is variable between predetermined limits by varying the setting of the variable resistor 17.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a circuit for applying a pulse of precise width to an output circuit, a first normally unoperated relay having a relay coil and three contacts, a first time delay circuit including a resistor connected in series with a first of said contacts and a capacitor connected across said relay coil for operating said relay coil upon a predetermined charge being impressed on said capacitor, means for applying electrical energy through said first contact and connected resistor to impress said predetermined charge on said capacitor and operate said first relay coil to draw up said contacts to interrupt said charging of said capacitor, an output relay operated by the drawing up of said first contact for applying the electrical energy to said output circuit, a locking circuit completed by a second of said drawn up contacts for maintaining the operation of said relay coil, a second time delay circuit including a capacitor connected in series with the third of said contacts and completed by the drawing up of said third contact, a second normally unoperated relay connected to said third contact and having a relay coil and a normally closed contact connected in series with the first relay, a resistor connected in said second time delay circuit for limiting current flow to said relay coil to preclude operation thereof, and an electron device having three electrodes, one of which controls the establishment of a current path between the other two electrodes, means connecting said current limiting resistor across said other two electrodes of said electron device, and means connecting said capacitor across said one electrode and one of said other electrodes of said electron device and operating said tube upon accumulation of a predetermined charge on said capacitor for establishing a current path between said other two electrodes of said electron device to bypass said current limiting resistor and operate said second relay coil to draw up its contacts to interrupt operation of both said first relay coil and said output relay.

2. In a circuit for applying a pulse of precise width to an output circuit as defined in claim 1, wherein:

said electron device is a gas tube having an anode, a cathode, and a control electrode which controls the establishment of a current path between said anode and said cathode.

References Cited by the Examiner

UNITED STATES PATENTS 2,433,354 12/1947 Aiken ............ 317—142

STEPHEN W. CAPELLI, *Primary Examiner.*

SAMUEL BERNSTEIN, *Examiner.*

L. T. HIX, *Assistant Examiner.*